(12) United States Patent
King

(10) Patent No.: US 10,465,976 B2
(45) Date of Patent: Nov. 5, 2019

(54) COOKING WITHIN A REFRIGERATION CAVITY

(71) Applicants: BSH Home Appliances Corporation, Irvine, CA (US); BSH Hausgeräte GmbH, Munich (DE)

(72) Inventor: Benjamin King, Alexandria, OH (US)

(73) Assignees: BSH Home Appliances Corporation, Irvine, CA (US); BSH Hausgräte GmbH, Munich (DE)

( * ) Notice: Subject to any disclaimer, the term of this patent is extended or adjusted under 35 U.S.C. 154(b) by 341 days.

(21) Appl. No.: 15/158,684

(22) Filed: May 19, 2016

(65) Prior Publication Data

US 2017/0336133 A1   Nov. 23, 2017

(51) Int. Cl.

| F25D 23/12 | (2006.01) |
| F25D 29/00 | (2006.01) |
| A23L 3/365 | (2006.01) |
| F25D 31/00 | (2006.01) |
| A23L 3/36 | (2006.01) |
| A23L 5/10 | (2016.01) |

(Continued)

(52) U.S. Cl.
CPC ............... *F25D 23/12* (2013.01); *A23L 3/36* (2013.01); *A23L 3/365* (2013.01); *A23L 5/15* (2016.08); *A23L 5/36* (2016.08); *F25D 29/00* (2013.01); *F25D 29/005* (2013.01); *F25D 31/005* (2013.01); *F25B 2600/07* (2013.01); *F25D 25/02* (2013.01); *F25D 2500/06* (2013.01)

(58) Field of Classification Search
CPC .... F25D 23/12; F25D 31/005; F25D 2500/06; A23L 3/365; G06K 7/10356; G06K 2017/0093; F24C 7/00; H04B 5/0062
See application file for complete search history.

(56) References Cited

U.S. PATENT DOCUMENTS 3,135,316 A * 6/1964 Foster ................... F25D 11/022
165/267
3,682,643 A * 8/1972 Foster ................... A23L 3/0055
426/233

(Continued)

FOREIGN PATENT DOCUMENTS

| JP | H0468286 A | 3/1992 |
| JP | H0689985 B2 | 11/1994 |

(Continued)

OTHER PUBLICATIONS

"Machine Translation of KR 20060107040 A, Lee et al., Oct. 2006".*

*Primary Examiner* — Frantz F Jules
*Assistant Examiner* — Martha Tadesse
(74) *Attorney, Agent, or Firm* — Michael E. Tschupp; Andre Pallapies; Brandon G. Braun

(57) ABSTRACT

A domestic appliance for cooling and heating food items and/or beverage items may include a shell, a door, a cooling compartment defined at least in part by the shell and the door, the compartment being configured store the food items and/or the beverage items in a cooled environment and at least one solid state heating element inside of the cooling compartment, the at least one solid state heating element configured to emit infrared radiation to heat at least one of the food items and/or the beverage items without heating the surroundings or other contents of the cooling compartment.

21 Claims, 5 Drawing Sheets

(51) Int. Cl.
  *A23L 5/30* (2016.01)
  *F25D 25/02* (2006.01)

(56) References Cited

U.S. PATENT DOCUMENTS

| | | | | |
|---|---|---|---|---|
| 4,002,199 | A * | 1/1977 | Jacobs | F25D 17/062 165/61 |
| 4,303,820 | A | 12/1981 | Stottmann et al. | |
| 4,385,075 | A | 5/1983 | Brooks | |
| 4,881,590 | A | 11/1989 | Meier | |
| 6,297,481 | B1 * | 10/2001 | Gordon | A47J 39/006 219/406 |
| 6,741,523 | B1 * | 5/2004 | Bommarito | G01K 3/04 116/220 |
| 6,892,545 | B2 | 5/2005 | Ishikawa et al. | |
| 7,425,296 | B2 | 9/2008 | Cochran et al. | |
| 8,389,916 | B2 * | 3/2013 | Ben-Shmuel | A23L 3/01 219/687 |
| 2004/0108106 | A1 * | 6/2004 | Clark | F25D 23/12 165/206 |
| 2005/0103467 | A1 * | 5/2005 | Landry | F25D 23/12 165/61 |
| 2006/0191885 | A1 * | 8/2006 | Near | G06Q 10/0631 219/214 |
| 2006/0191914 | A1 * | 8/2006 | Guindulain Vidondo | G07F 9/105 219/679 |
| 2006/0280825 | A1 | 12/2006 | Cochran et al. | |
| 2007/0096352 | A1 | 5/2007 | Cochran et al. | |
| 2008/0066475 | A1 * | 3/2008 | Cho | A23L 3/26 62/130 |
| 2009/0090734 | A1 * | 4/2009 | Wittern, Jr. | F25D 17/065 221/1 |
| 2010/0034935 | A1 * | 2/2010 | Wally | A47J 37/00 426/232 |
| 2011/0002675 | A1 | 1/2011 | Cochran et al. | |
| 2011/0002677 | A1 | 1/2011 | Cochran et al. | |
| 2011/0147369 | A1 * | 6/2011 | Spooner | F41J 2/02 219/552 |
| 2011/0203768 | A1 * | 8/2011 | Nishita | F25D 11/02 165/59 |
| 2014/0252091 | A1 * | 9/2014 | Morse | F25D 29/00 235/385 |
| 2015/0285552 | A1 * | 10/2015 | Swaidan | F25D 23/12 62/80 |
| 2016/0162715 | A1 * | 6/2016 | Luk | F25D 29/005 235/385 |
| 2016/0327279 | A1 * | 11/2016 | Bhogal | H05B 1/0263 |

FOREIGN PATENT DOCUMENTS

| | | | |
|---|---|---|---|
| JP | 2009229037 A | 10/2009 | |
| KR | 2006107040 A | 10/2006 | |
| KR | 20060107040 A * | 10/2006 | F25D 23/12 |
| KR | 100643895 B1 | 11/2006 | |
| WO | 2010102263 A1 | 9/2010 | |
| WO | 2011152047 A1 | 12/2011 | |
| WO | 2011156823 A2 | 12/2011 | |

* cited by examiner

COOKING WITHIN A REFRIGERATION CAVITY

FIELD OF THE TECHNOLOGY

The field of the present technology pertains to a domestic appliance that may include at least one compartment to cool goods such as food and/or beverage items. The compartment may also include a heating element to heat at least one of the food and/or beverage items.

BACKGROUND OF THE TECHNOLOGY

Domestic appliances that cool their contents, e.g., refrigerators and freezers, typically perform only a cooling function. For example, refrigerators cool their contents to below ambient temperatures, but above freezing temperatures, and freezers are intended to cool their contents to below freezing temperatures. However, these appliances typically do not provide any other treatment functions to further prepare the contents.

Often these contents may ultimately require some measure of heating before being consumed or receiving other additional treatment by another appliance. For example, frozen meals (i.e., TV dinners) need to be cooked completely before being consumed and this is typically accomplished by heating in a microwave oven or a conventional oven. Other food items, such as frozen meat, may require heating to be defrosted (e.g., in a microwave oven) before being cooked for consumption by still another method (e.g., a conventional oven or a grill). The commonality among these examples is that many such food items require heating from a different appliance before being consumed.

While kitchens today commonly include a range of appliances to perform numerous functions, such arrangements may not provide the most efficient use of a given amount of kitchen space to accomplish the desired tasks. Moreover, such arrangements may not be configured to accomplish such tasks most efficiently in the temporal sense. In other words, common domestic appliance arrangements may not provide the most efficient allocation of resources for the end user.

BRIEF SUMMARY OF THE TECHNOLOGY

The present technology seeks to provide improvements over prior art technologies. The present technology also seeks to improve upon the deficiencies of the known technologies described above.

The present technology may accomplish such improvements by providing a domestic appliance with at least one compartment to cool goods contained therein. Within the compartment a heating element may also be provided to heat the goods within the cooled environment of the compartment.

An aspect of the present technology is directed to a domestic appliance for cooling and heating food items and/or beverage items. The domestic appliance may comprise a shell, a door, a cooling compartment defined at least in part by the shell and the door, the cooling compartment being configured to store the food items and/or the beverage items in a cooled environment, and at least one solid state heating element inside of the cooling compartment, the at least one solid state heating element configured to emit infrared radiation to heat at least one of the food items and/or the beverage items without heating ambient surroundings within the cooling compartment or other contents of the cooling compartment.

In examples, (a) the at least one solid state heating element may be a semiconductor diode, (b) the domestic appliance may comprise a heating compartment defined inside of the cooling compartment for heating at least one of the food items and/or the beverage items and the at least one solid state heating element may be positioned inside of the heating compartment to heat at least one of the food items and/or the beverage items, (c) the heating compartment may be a drawer, (d) at least one interior surface of the heating compartment may include a retroreflective material to reflect the infrared radiation to at least one of the food items and/or the beverage items, (e) the retroreflective material may comprise cube corner retroreflectors, (f) the domestic appliance may comprise a shelf inside of the cooling compartment and the at least one solid state heating element may be positioned to emit infrared radiation to heat at least one of the food items and/or the beverage items located on the shelf, (g) a surface of the shelf and/or at least one interior surface of the cooling compartment may include a retroreflective material to reflect the infrared radiation to at least one of the food items and/or the beverage items, (h) the retroreflective material may comprise cube corner retroreflectors, (i) at least one interior surface of the cooling compartment may include a retroreflective material to reflect the infrared radiation to at least one of the food items and/or the beverage items, (j) the retroreflective material may comprise cube corner retroreflectors, (k) the domestic appliance may comprise a controller configured to control the cooling compartment and the at least one solid state heating element, (l) the domestic appliance may comprise an item identification module configured to detect identification information of at least one of the food items and/or the beverage items and the item identification module may be configured to communicate the identification information to the controller, (m) the controller may be configured to activate the at least one solid state heating element based on the identification information, (n) the item identification module may be a universal product code (UPC) scanner and the identification information may comprise a UPC label on at least one of the food items and/or the beverage items to identify at least one of the food items and/or the beverage items, (o) the domestic appliance may comprise a network communication module configured to communicate with an external data storage system via the Internet, (p) the network communication module may be a Wi-Fi module, (q) the domestic appliance may comprise a user interface configured to exchange information between a user and the controller, (r) the user interface may comprise a display screen and at least one user input device, (s) the at least one user input device may comprise at least one of a touch-sensitive input device that is substantially coextensive with the display screen and a microphone, (t) the at least one solid state heating element may comprise a plurality of solid state heating elements configured to be activated individually by the controller, and/or (u) at least two of the plurality of solid state heating elements may be configured to emit infrared radiation at different bandwidths.

Of course, portions of the aspects may form sub-aspects of the present technology. Also, various ones of the sub-aspects and/or aspects may be combined in various manners and also constitute additional aspects or sub-aspects of the present technology.

Other features of the technology will be apparent from consideration of the information contained in the following detailed description, abstract, drawings and claims.

DETAILED DESCRIPTION OF THE TECHNOLOGY

Before the present technology is described in further detail, it is to be understood that the technology is not limited to the particular examples described herein, which may vary. It is also to be understood that the terminology used in this disclosure is for the purpose of describing only the particular examples discussed herein, and is not intended to be limiting.

The following description is provided in relation to various examples which may share one or more common characteristics and/or features. It is to be understood that one or more features of any one example may be combinable with one or more features of another example or other examples. In addition, any single feature or combination of features in any of the examples may constitute a further example.

Figure 1:
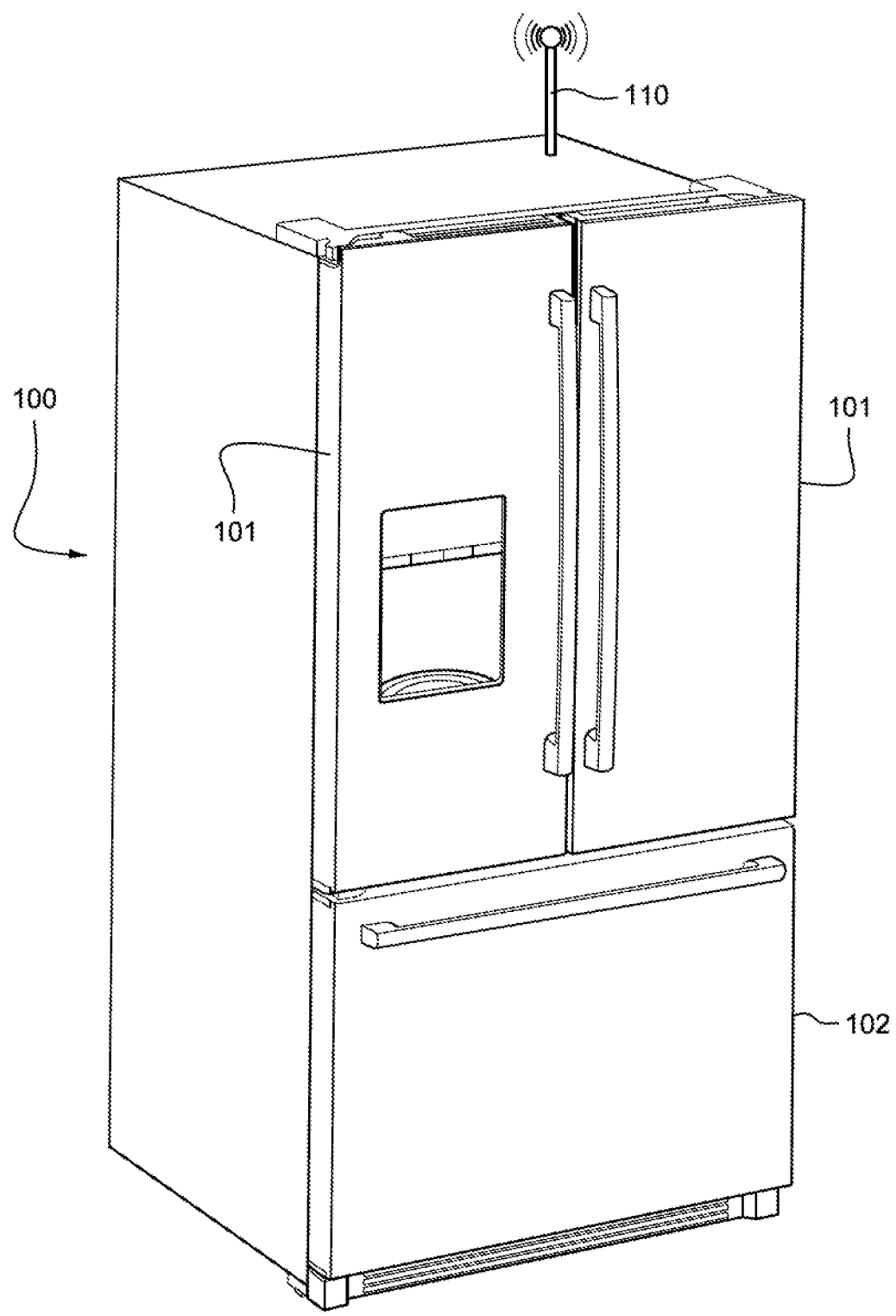
FIG. 1 is a perspective view of a domestic appliance with its doors in a closed position according to an example of the present technology.

FIG. 1 depicts a domestic appliance 100, which is a combination refrigerator/freezer in this example. More particularly, this example is a French door-type refrigerator/freezer that includes upper compartment doors 101 and a lower compartment door 102. The upper compartment doors 101 are shown in a closed position and enclose an upper compartment 103. The lower compartment door 102 is also shown in a closed position and encloses a lower compartment 104. In this example, the upper compartment 103 is the refrigerator and the lower compartment is the freezer 104. These compartments may be further defined by a shell of the domestic appliance 100. While this particular example depicts a French door-type refrigerator/freezer combination appliance, it should be understood that the present technology could be applied to other similar domestic appliance arrangements. For example, the present technology could be applied to a freezer-only domestic appliance, a refrigerator-only domestic appliance, a side-by-side refrigerator/freezer combination, or a refrigerator/freezer combination with a top or bottom freezer.

FIG. 1 also depicts a network communication module 110. In this example, the network communication module 110 is a Wi-Fi module including an antenna positioned on the exterior of the domestic appliance. The network communication module 110 may, in an alternative example, be positioned internally of the domestic appliance 100. The network communication module 110 will be described in greater detail below.

Figure 2:
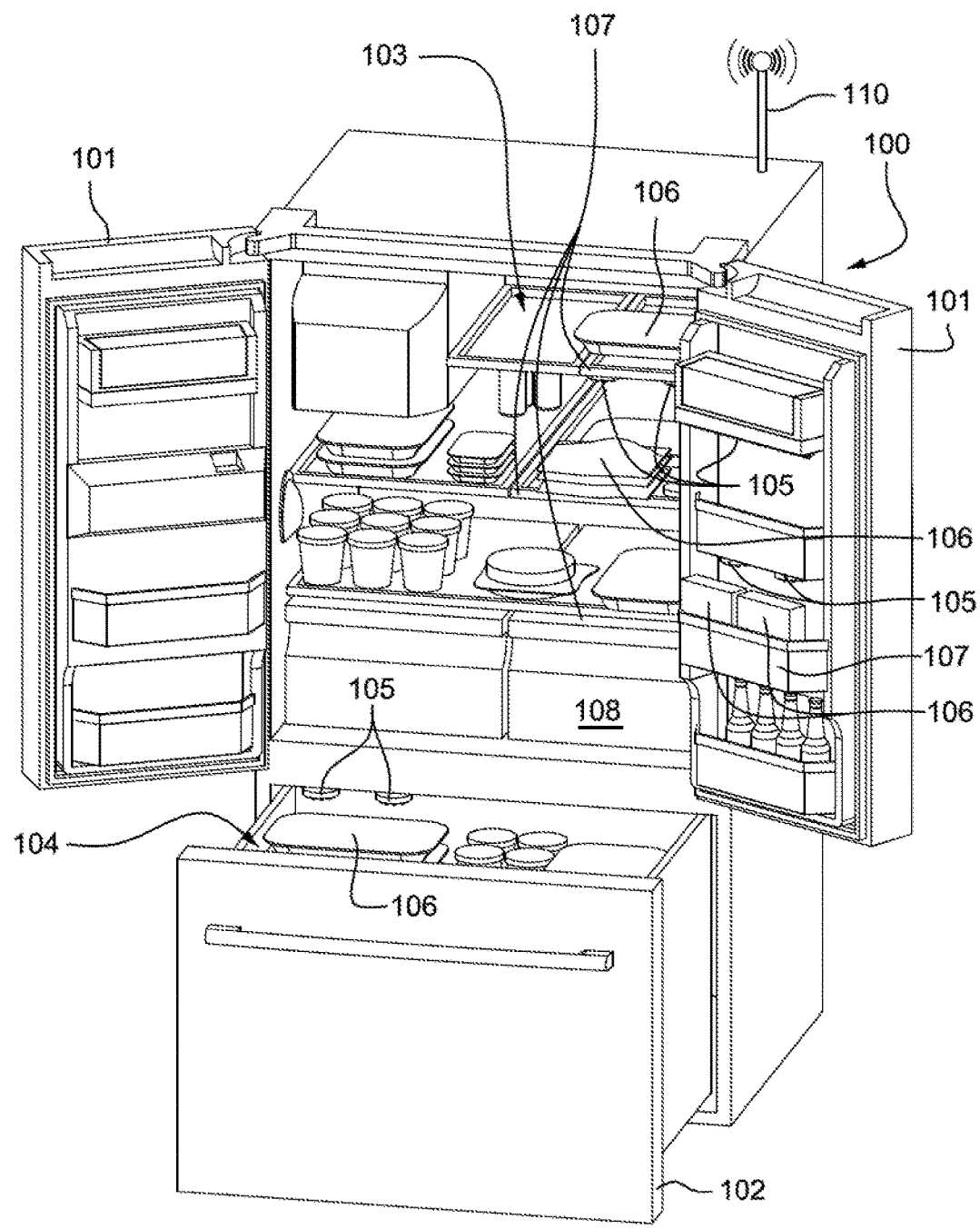
FIG. 2 is another perspective of a domestic appliance with its doors in an open position according to an example of the present technology.

FIG. 2 depicts a perspective view of the domestic appliance 100 with the upper compartment doors 101 and the lower compartment door 102 in an open position to expose the interior of the upper compartment 103 and the lower compartment 104. In the upper compartment 103 and the lower compartment 104, shelves 107 and drawers 108 are shown containing items 106 such as food and beverages. These food and beverage items 106 may be cooled within the respective compartments to the desired temperature depending on the type of item.

Figure 3:
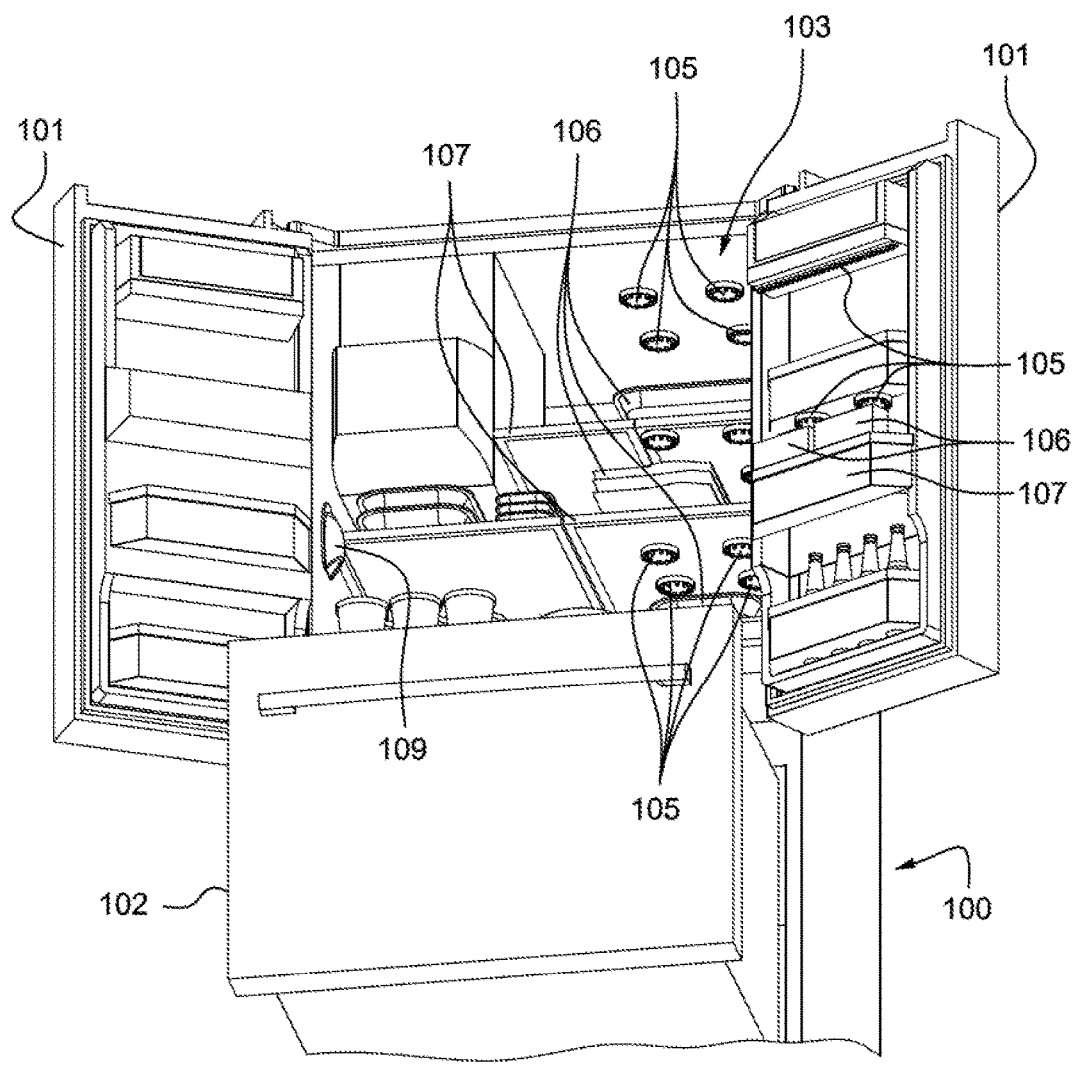
FIG. 3 is another perspective of a domestic appliance with its doors in an open position according to an example of the present technology.

FIG. 2 also depicts heating elements 105. The heating elements 105 may be positioned on the underside of the shelves 107 and/or drawers 108 to heat an adjacent item 106. FIG. 3 depicts exemplary arrangements of the heating elements 105 in greater detail. It should be understood that the exemplary locations and quantity of the heating elements 105 are not limiting. For example, only one heating element 105 may be provided or a plurality of heating elements 105 may be provided. Furthermore, the heating element(s) 105 may be arranged in arrays of varying quantities and varying orientations. For example, heating element(s) 105 may be positioned on the sidewalls of the compartments 103, 104, on the top or bottom of shelves 107, and/or on the top or bottom of drawers 108. Furthermore, heating element(s) 105 may be provided only in the refrigerator portion, only in the freezer portion, or in both the refrigerator portion and the freezer portion of the domestic appliance 100. Additionally, the heating elements 105 are depicted in a circular shape in these examples, but may take on any other polygonal shape.

Figure 4:
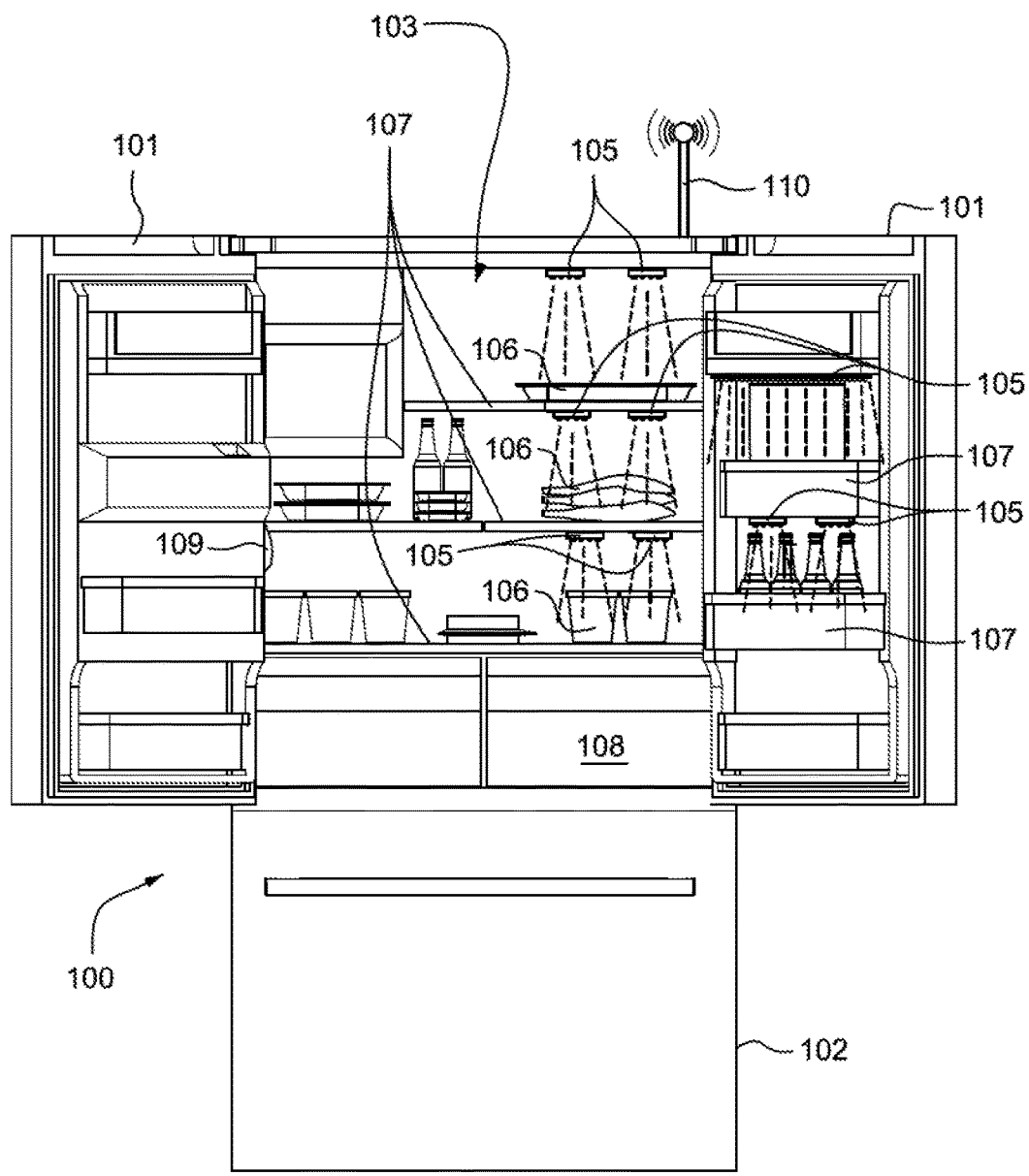
FIG. 4 a front view of a domestic appliance with its doors in an open position according to an example of the present technology.

In FIG. 4, the heating elements 105 are shown directing energy towards the items 106 on the shelves 107 and the drawers. According to an example of the present technology, the heating elements 105 apply digital heat injection (DHI), which is characterized as high intensity, narrow band, solid state infrared (IR) radiation. The heating elements may be diodes or semiconductor diodes that emit such radiation. A given heating element 105 may have one or a plurality of such diodes. Accordingly, DHI applies direct thermal transfer of energy via high intensity, targeted, light transfer for direct penetration into a load, i.e., the items 106, with minimal interference of the compartments 103, 104 within the appliance 100. Accordingly, the appliance 100 may be a combination appliance that cooks, defrosts, or otherwise heats food product directly in the compartments 103, 104, which are thermally controlled for food/beverage storage.

Additionally, the concept commonly known as Internet of Things (IoT) enables prepackaged foods to be cooked, rethermalized, or otherwise heated to manufacturers recommendations accurately (e.g., with control over particular zones of the individual items 106 to which DHI is applied), quickly and efficiently within a thermally controlled chamber, i.e., the compartment 103, 104, with little impact on the ambient condition within the compartments 103, 104. This can be accomplished by tuning the wavelength of the emitted IR radiation from the heating elements 105 to maximize absorption by the target item(s) 106. However, such IR radiation does not heat the ambient surrounding of the compartments 103, 104, because IR radiation is not thermally conducted. Rather, IR radiation only is absorbed by the target item(s) 106 such that only these items are heated. The only increase in the temperature within the compartments 103, 104 would be caused by the heated target item(s) 106 conducting heat to the surroundings of the compartments 103, 104.

The IoT aspects may be performed by components including, but not limited to, the network communication module 110, a controller (not shown), and a scanner 109. For example, the appliance 100 may use existing UPC codes to find product information of the item(s) 106 online via the network communication module 110, which allows the appliance 100 to direct DHI from the heating elements 105 to the item(s) 106 at the optimum intensity, duration, wavelength etc. to heat the item(s) 106 according to the specifications of the manufacturer. The scanner 109 may be used to scan a UPC code on the item(s) 106, which is interpreted by the controller. The UPC code may then be correlated within a locally stored database (e.g., on a hard drive or other storage device) to a particular item. Then, the controller may instruct the heating the elements 105 to apply DHI to the item(s) 106 in accordance with heating parameters for the detected item(s) 106 that are stored locally. Alternatively, the network communication module 110 may communicate the scanned UPC code externally via the Internet to a database stored remotely (e.g., on a server in the cloud). The scanned UPC code may be then be correlated within the remote database to a particular item. Then, the controller may instruct the heating the elements 105 to apply DHI to the item(s) 106 in accordance with heating parameters for the detected item(s) 106 that are transmitted back to the appliance 100 from the Internet via the network communication module 110.

In the case of multi-zone item(s) 106 (e.g. TV dinners), the targeted DHI application by the heating elements 105 may allow cooking or rethermalization for multiple loads (e.g. meat, potatoes, vegetables, etc.) within the same tray at the same time.

In further examples, the scanner 109 could be located externally of the appliance 100 as well. Alternative components for identification of the item(s) 106 are also envisioned. For example, the appliance 100 may be provided with an input device such as a numeric of alphanumeric keyboard. The appliance 100 may also include a display (not shown) that may include a touch-sensitive panel that is substantially coextensive with the display and the touch-sensitive panel may receive user input.

Additionally, the network communication module 110 may be a Wi-Fi module or may be an Ethernet module. Bluetooth and/or near field communication (NFC) are also envisioned as examples of the network communication module 110. Furthermore, the appliance 100 could receive user input from an external device such as a smartphone that communicates with the appliance via the network communication module 110. In another example, the appliance 100 may include a microphone (not shown) for receiving voice commands from the user.

The appliance 100 may also be able to identify the placement/orientation of the item(s) 106 on the shelf 107 or drawer 108 for zone heating in the case of prepackaged meals with multiple zones such as TV dinners. Such orientation determinations may be made by sensors that detect the position of the item(s) 106 optically or by user input in accordance with the methods described above.

Figure 5:
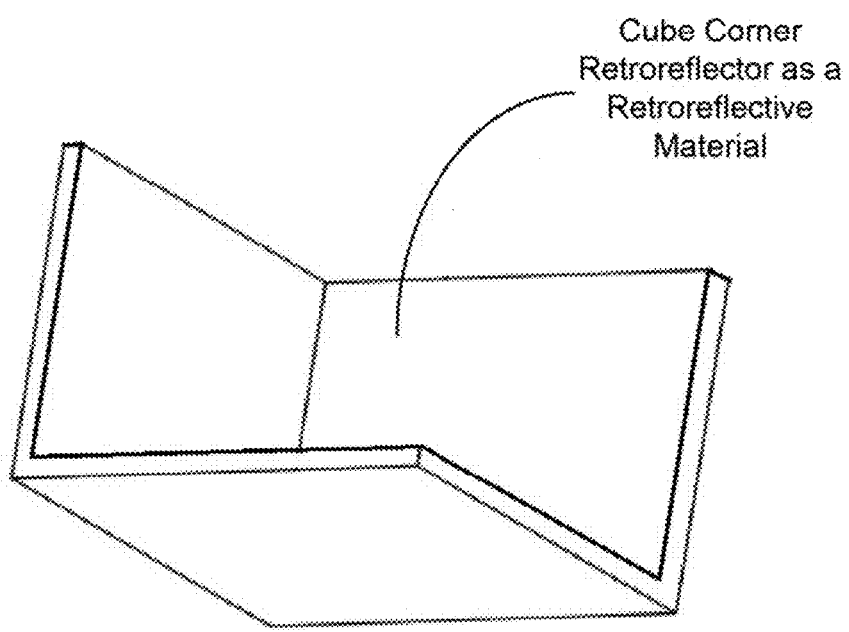
FIG. 5 is a schematic illustration showing a retroreflective material in the form of a cube corner retroreflector.

The appliance 100 may also include retroreflectors (e.g., corner cube retroreflective surfaces) (see FIG. 5) on surfaces within the compartments 103, 104 to ensure that any stray IR radiation from the heating elements 105 is redirected to the item(s) 106 being treated. The shelves 107 and/or the drawers 108 may also include retroreflective surfaces. By providing interior surfaces with retroreflectors, almost all IR radiation from the heating elements 105 will be directed to the item(s) 106 in the compartment 103, 104, resulting in the only thermal transfer to the internal cavity coming from the food source itself and thereby minimizing the impact on the temperature of the compartments 103, 104.

It is also envisioned that the item(s) may be heated in other than the shelves 107 and the drawers 108. For example, one of the doors 101, 102 may include a pass through chamber in which the user would place the item(s) 106 into for heating from inside the door 101, 102 and remove the heated item(s) 106 from an outside door. Alternatively, the heating elements 105 may be contained in a cavity of one of the doors 101, 102, which can be accessed from either inside or outside the appliance. Such an arrangement can offer more effective thermal separation from the cooled compartments 103, 104 of the appliance 100.

Although the technology herein has been described with reference to particular examples, it is to be understood that these examples are merely illustrative of the principles and applications of the technology. In some instances, the terminology and symbols may imply specific details that are not required to practice the technology. For example, although the terms "first" and "second" may be used, unless otherwise specified, they are not intended to indicate any order but may be utilized to distinguish between distinct elements. Furthermore, although process steps in the methodologies may be described or illustrated in an order, such an ordering is not required. Those skilled in the art will recognize that such ordering may be modified and/or aspects thereof may be conducted concurrently or even synchronously. It is therefore to be understood that numerous modifications may be made to the illustrative examples and that other arrangements may be devised without departing from the spirit and scope of the technology.

The invention claimed is:

1. A domestic appliance for cooling and heating food items and/or beverage items, the domestic appliance comprising:
   a shell;
   a door;
   a cooling compartment defined at least in part by the shell and the door, the cooling compartment being configured to store the food items and/or the beverage items in a cooled environment; and
   at least one solid state heating element comprising at least one of a diode or a semiconductor diode configured to apply a digital heat injection (DHI) which comprises a high intensity, narrow band, solid state infrared radiation (IR), the at least one solid state heating element being disposed inside of the cooling compartment and exposed to the cooled environment of the cooling compartment, the at least one solid state heating element configured to emit the solid state infrared radiation such that the DHI applies direct thermal transfer of energy via targeted light transfer for direct penetration into at least one of the food items and/or the beverage items to heat the at least one of the food items and/or the beverage items without heating ambient surroundings within the cooling compartment or other contents of the cooling compartment.

2. The domestic appliance of claim 1, further comprising a heating compartment defined inside of the cooling compartment for heating at least one of the food items and/or the beverage items,
   wherein the at least one solid state heating element is positioned inside of the heating compartment to heat at least one of the food items and/or the beverage items.

3. The domestic appliance of claim 2, wherein the heating compartment is a drawer.

4. The domestic appliance of claim 2, wherein at least one interior surface of the heating compartment includes a retroreflective material to reflect the solid state infrared radiation to at least one of the food items and/or the beverage items.

5. The domestic appliance of claim 4, wherein the retroreflective material comprises cube corner retroreflectors.

6. The domestic appliance of claim 1, further comprising a shelf inside of the cooling compartment,
wherein the at least one solid state heating element is positioned to emit the solid state infrared radiation to heat at least one of the food items and/or the beverage items located on the shelf.

7. The domestic appliance of claim 6, wherein a surface of the shelf and/or at least one interior surface of the cooling compartment includes a retroreflective material to reflect the solid state infrared radiation to at least one of the food items and/or the beverage items.

8. The domestic appliance of claim 7, wherein the retroreflective material comprises cube corner retroreflectors.

9. The domestic appliance of claim 1, wherein at least one interior surface of the cooling compartment includes a retroreflective material to reflect the solid state infrared radiation to at least one of the food items and/or the beverage items.

10. The domestic appliance of claim 9, wherein the retroreflective material comprises cube corner retroreflectors.

11. The domestic appliance of claim 1, further comprising a controller configured to control the cooling compartment and the at least one solid state heating element.

12. The domestic appliance of claim 11, further comprising an item identification module configured to detect identification information of at least one of the food items and/or the beverage items and the item identification module configured to communicate the identification information to the controller.

13. The domestic appliance of claim 12, wherein the controller is configured to activate the at least one solid state heating element based on the identification information.

14. The domestic appliance of claim 12, wherein the item identification module is a universal product code (UPC) scanner and the identification information comprises a UPC label on at least one of the food items and/or the beverage items to identify at least one of the food items and/or the beverage items.

15. The domestic appliance of claim 12, further comprising a network communication module configured to communicate with an external data storage system via Internet.

16. The domestic appliance of claim 15, wherein the network communication module is a Wi-Fi module.

17. The domestic appliance of claim 11, further comprising a user interface configured to exchange information between a user and the controller.

18. The domestic appliance of claim 17, wherein the user interface comprises a display screen and at least one user input device.

19. The domestic appliance of claim 18, wherein the at least one user input device comprises at least one of a touch-sensitive input device that is substantially coextensive with the display screen and a microphone.

20. The domestic appliance of claim 11, wherein the at least one solid state heating element comprises a plurality of solid state heating elements configured to be activated individually by the controller.

21. The domestic appliance of claim 20, wherein at least two of the plurality of solid state heating elements are configured to emit the solid state infrared radiation at different bandwidths.

* * * * *